United States Patent
Suzuki et al.

(10) Patent No.: US 12,287,524 B2
(45) Date of Patent: Apr. 29, 2025

(54) LENS DRIVING APPARATUS, CAMERA MODULE AND CAMERA-MOUNTED APPARATUS

(71) Applicants: Miniswys S.A., Bienne (CH); Shun Suzuki, Tokyo (JP); Yoichi Itagaki, Tokyo (JP)

(72) Inventors: Shun Suzuki, Tokyo (JP); Yoichi Itagaki, Tokyo (JP); Raphael Hoesli, Nidau (CH); Maxime Roten, Fenin (CH); Michael Brumann, Bienne (CH); Loann Baume, Neuchâtel (CH)

(73) Assignees: Miniswys S.A., Bienne (CH); MITSUMI ELECTRIC CO., LTD., Tokyo (JP)

( * ) Notice: Subject to any disclaimer, the term of this patent is extended or adjusted under 35 U.S.C. 154(b) by 721 days.

(21) Appl. No.: 17/616,710

(22) PCT Filed: Jun. 2, 2020

(86) PCT No.: PCT/JP2020/021770
§ 371 (c)(1),
(2) Date: Dec. 6, 2021

(87) PCT Pub. No.: WO2020/246465
PCT Pub. Date: Dec. 10, 2020

(65) Prior Publication Data
US 2022/0308303 A1    Sep. 29, 2022

(30) Foreign Application Priority Data

Jun. 7, 2019  (JP) ................................. 2019-107368

(51) Int. Cl.
G02B 7/00    (2021.01)
G02B 7/02    (2021.01)
(Continued)

(52) U.S. Cl.
CPC ............ *G02B 7/005* (2013.01); *G02B 7/023* (2013.01); *G02B 27/646* (2013.01); *H04N 23/55* (2023.01); *H04N 23/687* (2023.01)

(58) Field of Classification Search
CPC ...... G02B 7/005; G02B 7/023; G02B 27/646; H04N 23/55; H04N 23/687
See application file for complete search history.

(56) References Cited

U.S. PATENT DOCUMENTS

| 2007/0164635 A1 | 7/2007 | Witteveen |
| 2013/0050828 A1 | 2/2013 | Sato |
| 2017/0052386 A1 | 2/2017 | Siegrist |

FOREIGN PATENT DOCUMENTS

| JP | 60-090408 U | 6/1985 |
| JP | 07-135788 A | 5/1995 |

(Continued)

OTHER PUBLICATIONS

International Search Report from International Application No. PCT/JP2020/021770, mailed Dec. 7, 2021.

*Primary Examiner* — Wen Huang
(74) *Attorney, Agent, or Firm* — Shih IP Law Group, PLLC.

(57) ABSTRACT

A lens drive device is provided with a first fixed part, a first movable part, a first supporting part, and a Z-direction drive unit which moves the first movable section in an optical axis direction (the Z-direction) relative to the first fixed part and is constituted by an ultrasonic motor that converts vibration motion into rotational motion. The lens drive device further has a rotating body which rotates around the optical axis in response to rotational motion of the Z-direction drive unit, and a mechanical element which converts the rotational motion of the rotating body into linear motion in the optical (Continued)

axis direction, the first movable part being moved in the optical axis direction by rotation of the rotating body.

9 Claims, 11 Drawing Sheets

(51) Int. Cl.
*G02B 27/64* (2006.01)
*H04N 23/55* (2023.01)
*H04N 23/68* (2023.01)

(56) References Cited

FOREIGN PATENT DOCUMENTS

| | | |
|---|---|---|
| JP | 2005-354829 A | 12/2005 |
| JP | 2006-017923 A | 1/2006 |
| JP | 2006-338026 A | 12/2006 |
| JP | 2008-167561 A | 7/2008 |
| JP | 2008-220171 A | 9/2008 |
| JP | 2009-258497 A | 11/2009 |
| JP | 2011-215350 A | 10/2011 |
| JP | 2013-210550 A | 10/2011 |
| WO | 2015123787 A1 | 8/2015 |

LENS DRIVING APPARATUS, CAMERA MODULE AND CAMERA-MOUNTED APPARATUS

The disclosure of Japanese Patent Application No. 2019-107368, filed on Jun. 7, 2019, including the specification, drawings and abstract, is incorporated herein by reference in its entirety.

TECHNICAL FIELD

The present invention relates to a lens driving apparatus, a camera module, and a camera-mounted apparatus.

BACKGROUND ART

In general, a small-sized camera module is mounted in a mobile terminal such as a smartphone. To such a camera module, a lens driving apparatus is applied which has an auto-focusing function (hereinafter referred to as "AF (Auto Focus) function") of automatically performing focusing when a subject is photographed, and a shake-correcting function (hereinafter referred to as "OIS (Optical Image Stabilization) function") of reducing irregularities of an image by optically correcting shake (vibration) generated during photographing (for example, Patent Literature (hereinafter referred to as "PTL") 1).

The lens driving apparatus having the AF function and the OIS function includes: an auto-focusing driving part (hereinafter referred to as "AF driving part") for moving a lens part in a direction of an optical axis (hereinafter also referred to as "optical axis direction"); and a shake-correcting driving part (hereinafter referred to as "OIS driving part") for swaying the lens part within a plane orthogonal to the optical axis direction. In PTL 1, a voice coil motor (VCM) is applied to the AF driving part and the OIS driving part.

Further, in recent years, a camera module including a plurality of (typically two) lens driving apparatuses has been put into practical use (so-called dual camera). The dual camera has various possibilities depending on the use scenes, such as two images having different focal lengths can be simultaneously captured, a still image and a moving image can be simultaneously captured, and the like.

CITATION LIST

Patent Literature

PTL 1
Japanese Patent Application Laid-Open No. 2013-210550
PTL 2
WO 2015/123787

SUMMARY OF INVENTION

Technical Problem

However, the lens driving apparatus utilizing the VCM as in PTL 1 is subjected to the impact of external magnetism and therefore a highly accurate operation may be impaired. In particular, in a dual camera in which lens driving apparatuses are juxtaposed, it is highly likely that magnetic interference will occur between the lens driving apparatuses.

PTL 2, on the other hand, discloses a lens driving apparatus in which an ultrasonic motor is applied to an AF driving part and an OIS driving part. The lens driving apparatus disclosed in PTL 2 is magnetless and is therefore capable of reducing the impact of external magnetism, but has a complicated structure and has difficulty in allowing miniaturization and a reduction in height.

An object of the present invention is to provide a lens driving apparatus, a camera module, and a camera-mounted apparatus that are capable of reducing the impact of external magnetism and allow miniaturization and a reduction in height.

Solution to Problem

A lens driving apparatus according to the present invention includes:
 a first fixing part;
 a first movable part that includes a lens holder and is disposed so as to be separated from the first fixing part, where the lens holder holds a lens part;
 a first support part that supports the first movable part with respect to the first fixing part; and
 a Z-direction driving part that includes an ultrasonic motor and moves the first movable part in a direction of an optical axis with respect to the first fixing part. The ultrasonic motor converts vibration motion into linear motion. The lens driving apparatus further includes a rotating body and a mechanical element. The rotating body rotates around the optical axis by receiving linear motion of the Z-direction driving part. The mechanical element converts rotational motion of the rotating body into linear motion in the direction of the optical axis. The first movable part moves in the direction of the optical axis by rotation of the rotating body.

A camera module according to the present invention includes:
 the lens driving apparatus described above;
 the lens part that is attached to the first movable part; and
 an image-capturing part that captures a subject image formed by the lens part.

A camera-mounted apparatus according to the present invention is an information apparatus or a transport apparatus, and includes:
 the camera module described above; and
 an image-processing part that processes image information obtained by the camera module.

Advantageous Effects of Invention

According to the present invention, it is possible to provide a lens driving apparatus, a camera module, and a camera-mounted apparatus that are capable of reducing the impact of external magnetism and allow miniaturization and a reduction in height.

DESCRIPTION OF EMBODIMENTS

Hereinafter, a preferred embodiment of the present invention will be described in detail with reference to the accompanying drawings.

Figure 1A:
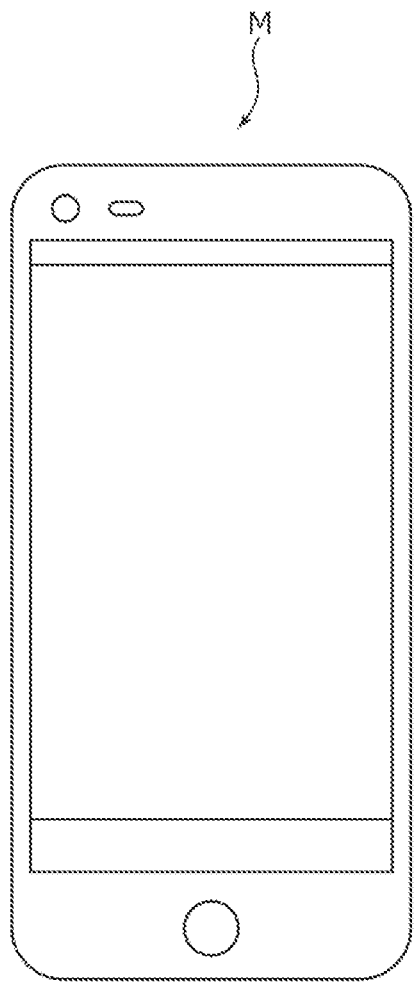
FIGS. 1A and 1B illustrate a smartphone in which a camera module is mounted according to an embodiment of the present invention.
Figure 1B:
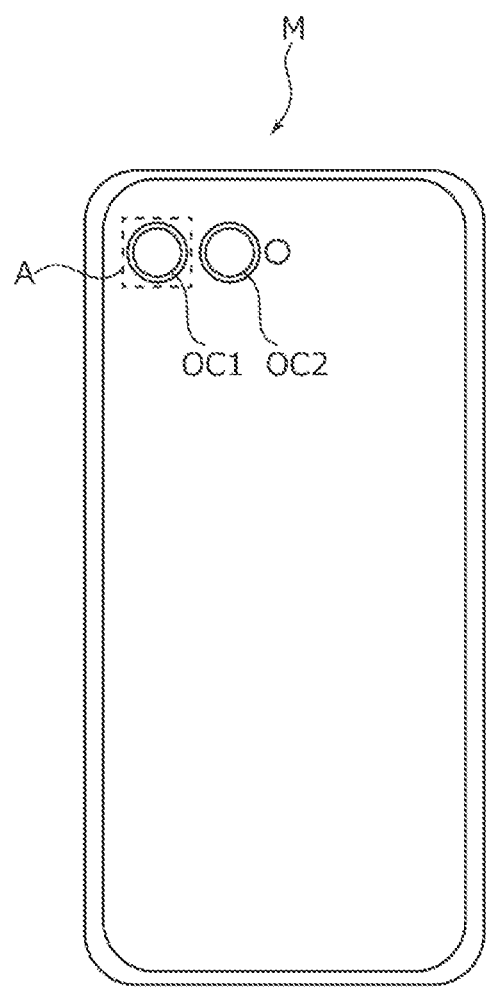

FIGS. 1A and 1B illustrate smartphone M (an example of the camera-mounted apparatus) in which camera module A is mounted according to an embodiment of the present invention. FIG. 1A is a front view of smartphone M, and FIG. 1B is a rear view of smartphone M.

Smartphone M includes a dual camera with two rear cameras OC1 and OC2. In the present embodiment, camera module A is applied to rear cameras OC1 and OC2.

Camera module A has the AF function and the OIS function, and is capable of photographing an image without image blurring by automatically performing focusing when a subject is photographed and by optically correcting shake (vibration) generated during photographing.

Figure 2:
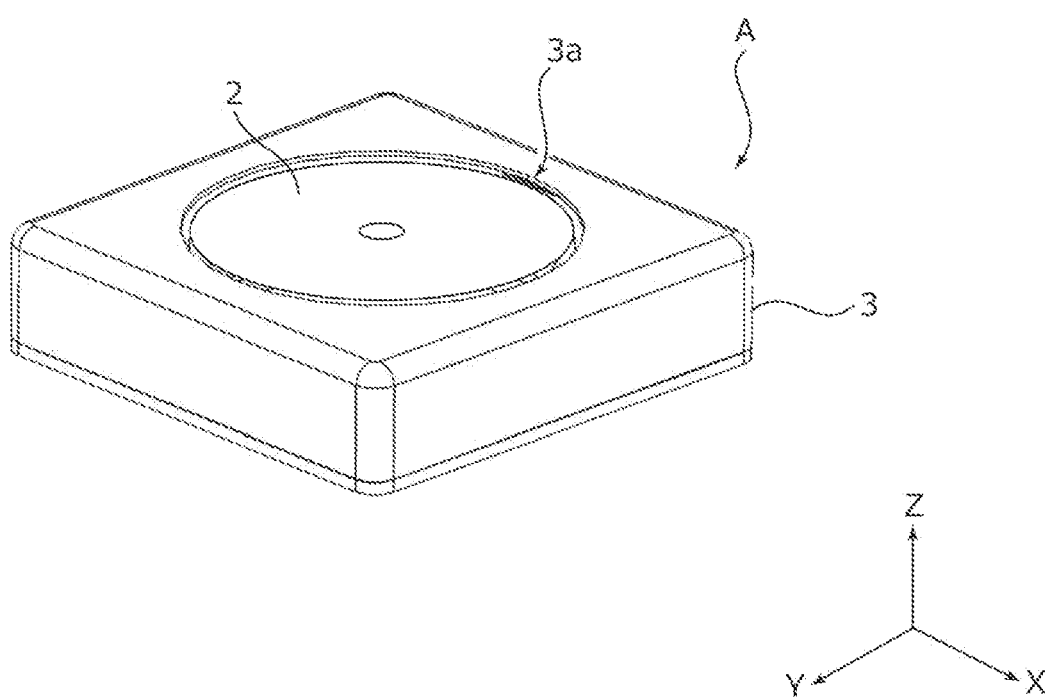
FIG. 2 is an external perspective view of the camera module.
Figure 3A:
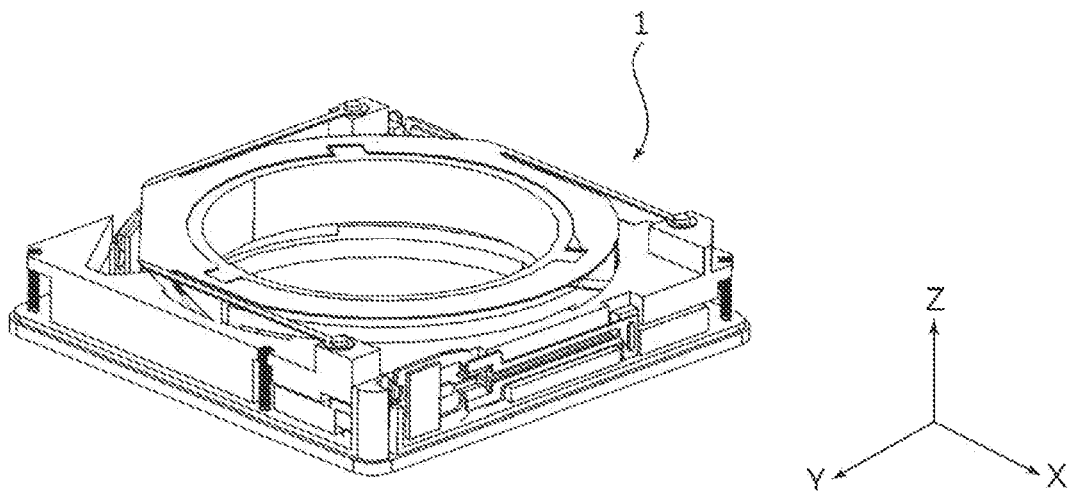
FIGS. 3A and 3B are external perspective views of a lens driving apparatus.
Figure 3B:
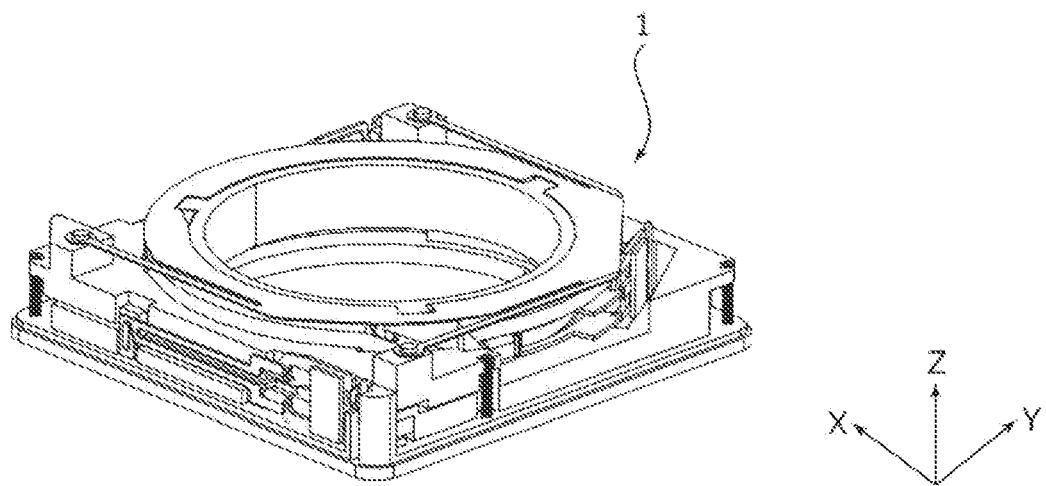

FIG. 2 is an external perspective view of camera module A. FIGS. 3A and 3B are external perspective views of lens driving apparatus 1. FIG. 3B illustrates a state in which FIG. 3A is rotated by 180° around the Z axis. As illustrated in FIGS. 2, 3A and 3B, a description will be given using an orthogonal coordinate system (X, Y, Z) in the present embodiment. The same orthogonal coordinate system (X, Y, Z) is also used in the drawings to be described later.

Camera module A is mounted such that the X direction is an up-down direction (or a left-right direction), the Y direction is a left-right direction (or an up-down direction), and the Z direction is a front-rear direction in a case where photographing is actually performed with smartphone M, for example. That is, the Z direction is a direction of an optical axis (an optical axis direction), the upper side (+Z side) in the drawings is a light reception side in the optical axis direction (a side of a subject), and the lower side (−Z side) in the drawings is an image formation side in the optical axis direction. Further, each of the X direction and the Y direction is an "optical axis-orthogonal direction" orthogonal to the Z axis, and the XY plane is an "optical axis-orthogonal plane" orthogonal to the optical axis.

As illustrated in FIG. 2 or the like, camera module A includes: lens driving apparatus 1 that realizes the AF function and the OIS function; lens part 2 in which a lens is housed in a lens barrel having a cylindrical shape; an image-capturing part (not illustrated) that captures a subject image formed by lens part 2; and cover 3 that entirely covers camera module A, and the like.

Cover 3 is a capped square cylindrical body having a rectangular shape in plan view viewed in the optical axis direction. In the present embodiment, cover 3 has a square shape in plan view. Cover 3 includes opening 3a in the upper surface. Opening 3a has a substantially circular shape. Lens part 2 is configured to face the outside through opening 3a, and to protrude to the light reception side from an opening surface of cover 3 in accordance with movement in the optical axis direction. Cover 3 is fixed to OIS fixing part 20 (see FIG. 4) of lens driving apparatus 1 by, for example, adhesion.

The image-capturing part (not illustrated) is disposed on the image formation side of lens driving apparatus 1 in the optical axis direction. The image-capturing part (not illustrated) includes, for example, an image sensor board, and an imaging element that is mounted in the image sensor board. The imaging element is formed of, for example, a charge-coupled device (CCD) image sensor, a complementary metal oxide semiconductor (CMOS) image sensor, or the like. The imaging element captures a subject image formed by lens part 2. Lens driving apparatus 1 is mounted in the image sensor board (not illustrated) and is mechanically and electrically connected to the image sensor board. A control part that controls the driving of lens driving apparatus 1 may be provided in the image sensor board or may be provided in a camera-mounted apparatus (smartphone M in the present embodiment) in which camera module A is mounted.

Figure 4:
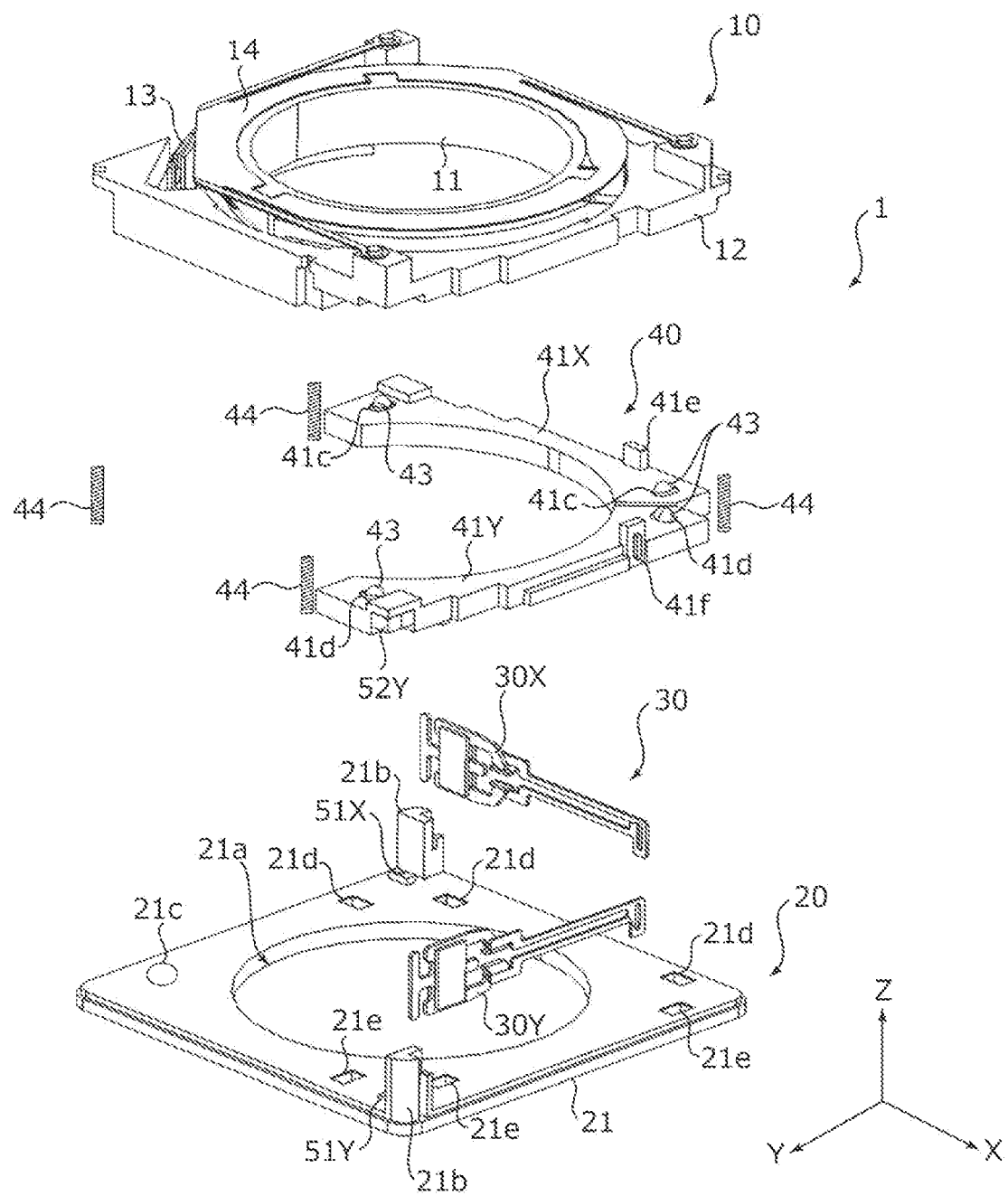
FIG. 4 is an exploded perspective view of the lens driving apparatus.
Figure 5:
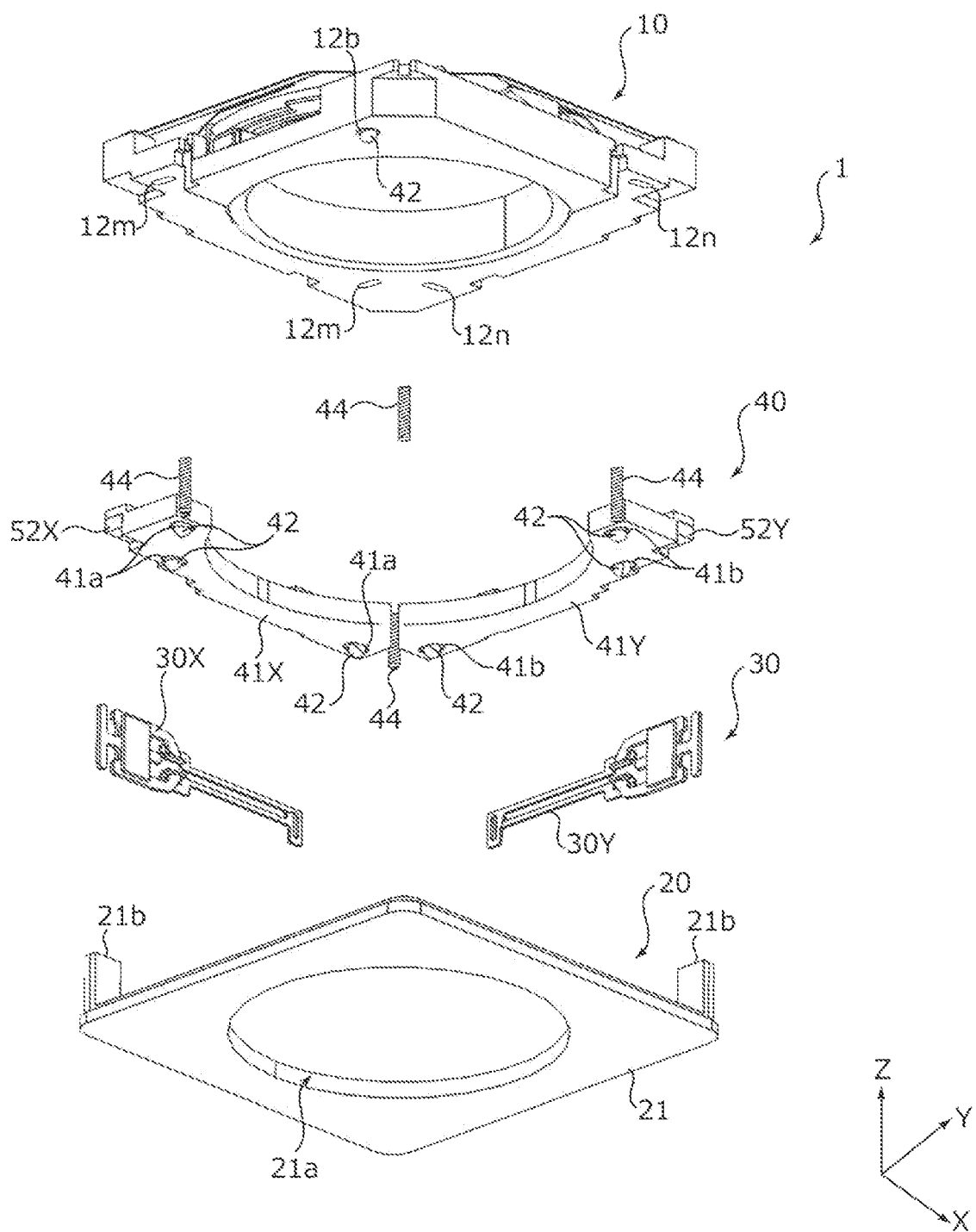
FIG. 5 is an exploded perspective view of the lens driving.

FIGS. 4 and 5 are exploded perspective views of lens driving apparatus 1. FIG. 5 illustrates a state in which FIG. 4 is rotated by 90° around the Z axis and is viewed from below.

As illustrated in FIGS. 4 and 5, lens driving apparatus 1 includes OIS movable part 10 (second movable part), OIS fixing part 20 (second fixing part), OIS driving part 30 (XY-direction driving part), OIS support part 40 (second support part), and the like in the present embodiment.

OIS movable part 10 is a portion which sways within the optical axis-orthogonal plane during shake correction. OIS movable part 10 includes an AF unit including: AF movable part 11 (first movable part); first stage 12 (first fixing part); AF driving part 13 (Z-direction driving part); AF support part 14 (first support part); and rotating spacer 15 (see FIG. 7 or the like).

OIS fixing part 20 is a portion to which OIS movable part 10 is connected via OIS support part 40. OIS fixing part 20 includes base 21.

OIS support part 40 supports OIS movable part 10 in a state in which OIS movable part 10 is separated from OIS fixing part 20 in the optical axis direction. OIS support part 40 includes second stages 41X and 41Y, balls 42 and 43, and OIS urging member 44.

OIS movable part 10 is disposed so as to be separated from OIS fixing part 20 in the optical axis direction, and is coupled to OIS fixing part 20 via OIS support part 40. Further, OIS movable part 10 and OIS fixing part 20 are urged in mutually approaching directions by OIS urging members 44 provided at four positions of an outer peripheral surface of OIS movable part 10.

In the present embodiment, OIS movable part 10 is configured to be capable of accurately swaying within the XY plane by regulation of directions in which balls 42 and 43 (eleven balls in total) forming OIS support part 40 are rollable. Note that, the number of balls 42 and 43 forming OIS support part 40 can be changed as appropriate.

Base 21 is, for example, a member having a rectangular shape in plan view, which is formed of a molding material made of polyarylate (PAR), a PAR alloy (for example, PAR/PC) obtained by mixing a plurality of resin materials including PAR, or a liquid crystal polymer (LCP), and includes opening 21a in the center. Opening 21a has a circular shape.

Base 21 includes OIS motor fixing parts 21b in two corner parts. OIS driving part 30 is disposed in OIS motor fixing parts 21b. OIS motor fixing part 21b is formed to protrude from a main surface of base 21 toward the light reception side in the optical axis direction, and has a shape capable of holding OIS driving part 30.

A terminal metal fitting and wiring, albeit not illustrated, are disposed in base 21 by insert-molding, for example. Further, a sensor board in which Hall elements 51X and 51Y are mounted is disposed in base 21.

The wiring includes power supply lines to AF driving part 13 (see FIG. 7 or the like) and OIS driving part 30. For example, the wiring is exposed from a peripheral part of base 21, and is electrically connected to wiring formed in the sensor board and to OIS urging members 44.

Further, base 21 includes ball housing parts 21c, 21d, and 21e each of which houses ball 42. Ball housing part 21c is formed to be recessed in a circular shape, and houses ball 42 interposed between base 21 and first stage 12. Ball housing part 21d is formed to be recessed in a rectangular shape extending in the X direction, and houses ball 42 interposed between base 21 and second stage 41X. Ball housing part 21e is formed to be recessed in a rectangular shape extending in the Y direction, and houses ball 42 interposed between base 21 and second stage 41Y. For example, each of ball housing parts 21d and 21e includes side surfaces formed in a tapered shape such that the groove width narrows toward a side of the bottom surface.

The sensor board (not illustrated) includes the wiring (not illustrated) including power supply lines and signal lines both of which are for Hall elements 51X and 51Y. Hall elements 51X and 51Y are electrically connected to the wiring (not illustrated) of base 21 via the wiring (not illustrated) formed in the sensor board. In second stages 41X and 41Y, magnets 52X and 52Y are disposed at positions facing Hall elements 51X and 51Y, respectively. An XY-position detection part formed of Hall elements 51X and 51Y and magnets 52X and 52Y detects the positions of OIS movable part 10 in the X direction and the Y direction.

Second stages 41X and 41Y are formed of, for example, a liquid crystal polymer, and have an L-shape as a whole. Each of second stages 41X and 41Y includes an inner peripheral surface formed in an arc shape along the outer shape of lens holder 11. Second stages 41X and 41Y are disposed along the X direction and the Y direction, respectively. Further, the respective portions of second stages 41X and 41Y, where the portions are close to each other, are separated from each other at a predetermined interval such that second stages 41X and 41Y can move independently of each other.

Each of second stages 41X and 41Y includes an outer side surface formed to be recessed inwardly, where OIS driving parts 30X and 30Y are located, respectively, when lens driving apparatus 1 is assembled. In the present embodiment, a reduction in the height of OIS movable part 10 is achieved by forming second stages 41X and 41Y in an L-shape as a whole and by disposing second stages 41X and 41Y downward from a thinly-formed portion of first stage 12.

Engagement pieces 41e and 41f that protrude on the light reception side in the optical axis direction are provided on peripheral edges of second stages 41X and 41Y, respectively. One end parts of OIS power transmission parts 33 are fixed to engagement pieces 41e and 41f, respectively. Further, engagement pieces 41e and 41f are loosely fitted to engagement grooves 12g and 12h provided in first stage 12, respectively. Specifically, engagement piece 41e engages with engagement groove 12g at least to such an extent that their respective surfaces facing each other in the Y direction do not abut on each other when first stage 12 moves in the Y direction, and engagement piece 41f engages with engagement groove 12h at least to such an extent that their respective surfaces facing each other in the X direction do not abut on each other when first stage 12 moves in the X direction. That is, it is configured such that second stage 41X is not displaced even when first stage 12 moves in the Y direction, and that second stage 41Y is not displaced even when first stage 12 moves in the X direction.

Second stage 41X includes three ball housing parts 41a on the lower surface (the surface on the image formation side in the optical axis direction). Second stage 41Y includes three ball housing parts 41b on the lower surface (the surface on the image formation side in the optical axis direction). Each of ball housing parts 41a and 41b houses ball 42. Ball housing parts 41a, 41b face ball housing parts 21d and 21e of base 21. Ball housing part 41a is formed to be recessed in an oval shape extending in the X direction, and ball housing part 41b is formed to be recessed in an oval shape extending in the Y direction. Further, each of ball housing parts 41a and 41b includes side surfaces formed in a tapered shape such that the groove width narrows toward a side of the bottom surface.

Further, second stage 41X includes two ball housing parts 41c on the upper surface (the surface on the light reception side in the optical axis direction). Second stage 41Y includes two ball housing parts 41d on the upper surface (the surface on the light reception side in the optical axis direction). Each of ball housing parts 41c and 41d houses ball 43. Ball housing part 41c is formed to be recessed in an oval shape extending in the Y direction, and ball housing part 41d is formed to be recessed in an oval shape extending in the X direction. Further, each of ball housing parts 41c and 41d includes side surfaces formed in a tapered shape such that the groove width narrows toward a side of the bottom surface.

Balls 42 are held between ball housing parts 21c to 21e of base 21 and ball housing part 12b of first stage 12 and ball housing parts 41a and 41b of second stages 41X and 41Y. In particular, balls 42 are held by multipoint contacts between ball housing parts 21d and 21e of base 21 and ball housing parts 41a and 41b of second stages 41X and 41Y. Thus, ball 42 stably rolls in the X direction or the Y direction.

Further, balls 43 are held by multipoint contacts between ball housing parts 41c and 41d of second stages 41X and 41Y and the lower surface of first stage 12. Thus, ball 43 stably rolls in the X direction or the Y direction.

OIS urging member 44 is formed of, for example, a tension coil spring, and couples OIS movable part 10 to OIS fixing part 20. In the present embodiment, one end of OIS urging member 44 is connected to the wiring (not illustrated) of base 21, and another end of OIS urging member 44 is connected to wiring (not illustrated) of first stage 12. OIS urging member 44 receives a tensile load when coupling OIS movable part 10 to OIS fixing part 20, and acts so as to cause OIS movable part 10 and OIS fixing part 20 to approach each other. That is, OIS movable part 10 is held so as to be capable of swaying within the XY plane in a state of being urged in the optical axis direction (a state of being pressed against base 21) by OIS urging members 44. Thus, it is possible to hold OIS movable part 10 in a stable state without rattling.

Further, in the present embodiment, OIS urging member 44 functions as a power supply line to AF driving part 13.

OIS driving part 30 is an actuator that moves OIS movable part 10 in the X direction and the Y direction. Specifically, OIS driving part 30 is formed of first OIS driving part 30X (first XY-direction driving part) and second OIS driving part 30Y (second XY-direction driving part). First OIS driving part 30X moves OIS movable part 10 in the X direction. Second OIS driving part 30Y moves OIS movable part 10 in the Y direction.

First OIS driving part 30X is fixed to OIS motor fixing part 21b of base 21 so as to extend along the X direction. Second OIS driving part 30Y is fixed to OIS motor fixing part 21b of base 21 so as to extend along the Y direction. That is, first OIS driving part 30X and second OIS driving part 30Y are disposed along sides orthogonal to each other.

Figure 6A:
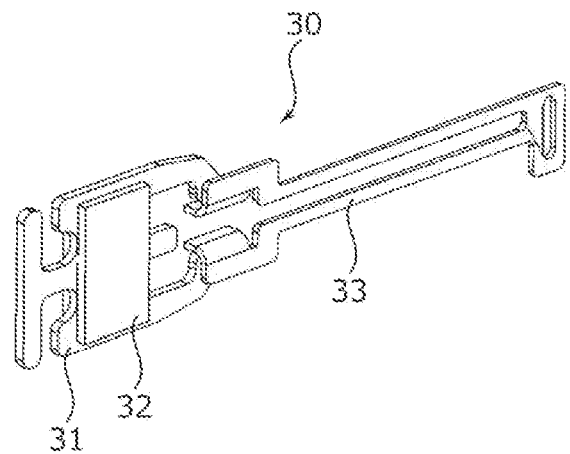
FIGS. 6A and 6B are perspective views of a first OIS driving part.
Figure 6B:
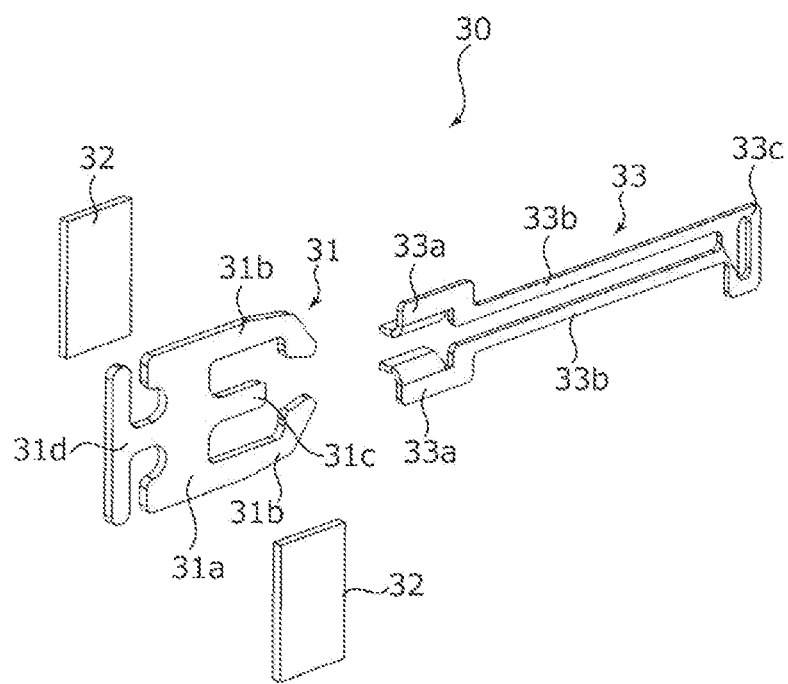

FIGS. 6A and 6B illustrate the configuration of OIS driving part 30. FIG. 6A illustrates a state in which each member of OIS driving part 30 is assembled. FIG. 6B illustrates a state in which each member of OIS driving part 30 is disassembled. Note that, FIGS. 6A and 6B illustrate second OIS driving part 30Y, but are treated as drawings illustrating OIS driving part 30 since the main configuration of first OIS driving part 30X is the same as that of second OIS driving part 30Y.

As illustrated in FIGS. 6A and 6B, OIS driving part 30 includes OIS resonance part 31, OIS piezoelectric element 32, an OIS electrode (not illustrated), and OIS power transmission part 33. OIS resonance part 31, OIS piezoelectric element 32, and the OIS electrode (not illustrated) form an ultrasonic motor. The driving force of the ultrasonic motor is transmitted to second stages 41X and 41Y via OIS power transmission part 33.

OIS piezoelectric element 32 is, for example, a plate-like element formed of a ceramic material, and generates vibration by application of a high-frequency voltage.

The OIS electrode (not illustrated) holds OIS resonance part 31 and OIS piezoelectric elements 32 from both sides, and applies a voltage to OIS piezoelectric elements 32. The OIS electrode is electrically connected to the wiring (not illustrated) of base 21, for example.

OIS resonance part 31 is formed of a conductive material, and resonates with vibration of OIS piezoelectric element 32 to convert vibration motion into linear motion. In the present embodiment, OIS resonance part 31 includes trunk part 31a, two arm parts 31b, protrusion part 31c, and energization part 31d. Trunk part 31a has a substantially rectangular shape and is held between OIS piezoelectric elements 32. Two arm parts 31b extend from upper and lower parts of trunk part 31a. Protrusion part 31c protrudes from a central part of trunk part 31a. Energization part 31d extends on a side opposite to protrusion part 31c from the central part of trunk part 31a. Energization part 31d is electrically connected to the wiring of base 21, for example. Each of two arm parts 31b has a symmetric shape, includes a free end part that abuts on OIS power transmission part 33, and symmetrically deforms when resonating with the vibration of OIS piezoelectric element 32.

Trunk part 31a of OIS resonance part 31 and OIS piezoelectric elements 32 are electrically connected to each other by bonding OIS piezoelectric elements 32 to trunk part 31a in the thickness direction and causing trunk part 31a and OIS piezoelectric elements 32 to be held from both sides by the OIS electrode (not illustrated). For example, one power supply path is connected to the OIS electrode and another power supply path is connected to energization part 31d of OIS resonance part 31 so that a voltage is applied to OIS piezoelectric elements 32 and vibration is generated.

OIS resonance part 31 has at least two resonance frequencies, and deforms in different behaviors for each resonance frequency. In other words, the entire shape of OIS resonance part 31 is set so as to deform in different behaviors with respect to the two resonance frequencies. The different behaviors refer to behaviors of advancing and retracting OIS power transmission part 33 in the X direction or the Y direction.

OIS power transmission part 33 is a chucking guide extending in one direction, and includes one end, which is connected to OIS resonance part 31, and another end, which is connected to second stage 41X or 41Y. OIS power transmission part 33 includes OIS motor abutment part 33a, stage fixing part 33c, and coupling part 33b. OIS motor abutment part 33a is formed, for example, to have a substantially U-shaped cross section, and abuts on the free end part of arm part 31b of OIS resonance part 31. Stage fixing part 33c is disposed in an end part of OIS power transmission part 33, and is fixed to engagement piece 41e (see FIG. 4 or the like) of second stages 41X or to engagement piece 41f (see FIG. 4 or the like) of second stage 41Y. Coupling part 33b is a portion that couples OIS motor abutment part 33a to stage fixing part 33c, and is formed to branch into two from stage fixing part 33c such that the branched portions are in parallel with each other.

The width between OIS motor abutment parts 33a is set to be wider than the width between the free end parts of arm parts 31b of OIS resonance part 31. Thus, when OIS power transmission part 33 is attached to OIS resonance part 31, OIS power transmission part 33 functions as a plate spring, and an urging force acts in a direction in which arm parts 31b of OIS resonance part 31 are pushed and spread. This urging force causes OIS power transmission part 33 to be held between the free end parts of arm parts 31b of OIS resonance part 31 so that a driving force from OIS resonance part 31 is efficiently transmitted to OIS power transmission part 33.

Since OIS resonance part 31 only abuts on OIS power transmission part 33 in an urged state, the movement distance (stroke) of OIS movable part 10 can be lengthened without enlarging the outer shape of lens driving apparatus 1, only by increasing the abutment portion in the X direction or the Y direction.

First OIS driving part 30X is fixed so as to couple base 21 to second stage 41X, and second OIS driving part 30X is fixed so as to couple base 21 to second stage 41Y.

During shake correction in the X direction by first OIS driving part 30X, second stage 41X and first stage 12 move, and second stage 41Y does not move. During shake correction in the Y direction by second OIS driving part 30Y, on the other hand, second stage 41Y and first stage 12 move, and second stage 41X does not move. That is, it is configured such that the movement of OIS movable part 10 by one of OIS driving parts 30 is not hindered by the structure of another of OIS driving parts 30. Since it is possible to prevent OIS movable part 10 from rotating around the Z axis, it is possible to cause OIS movable part 10 to accurately sway within the XY plane.

Figure 7:
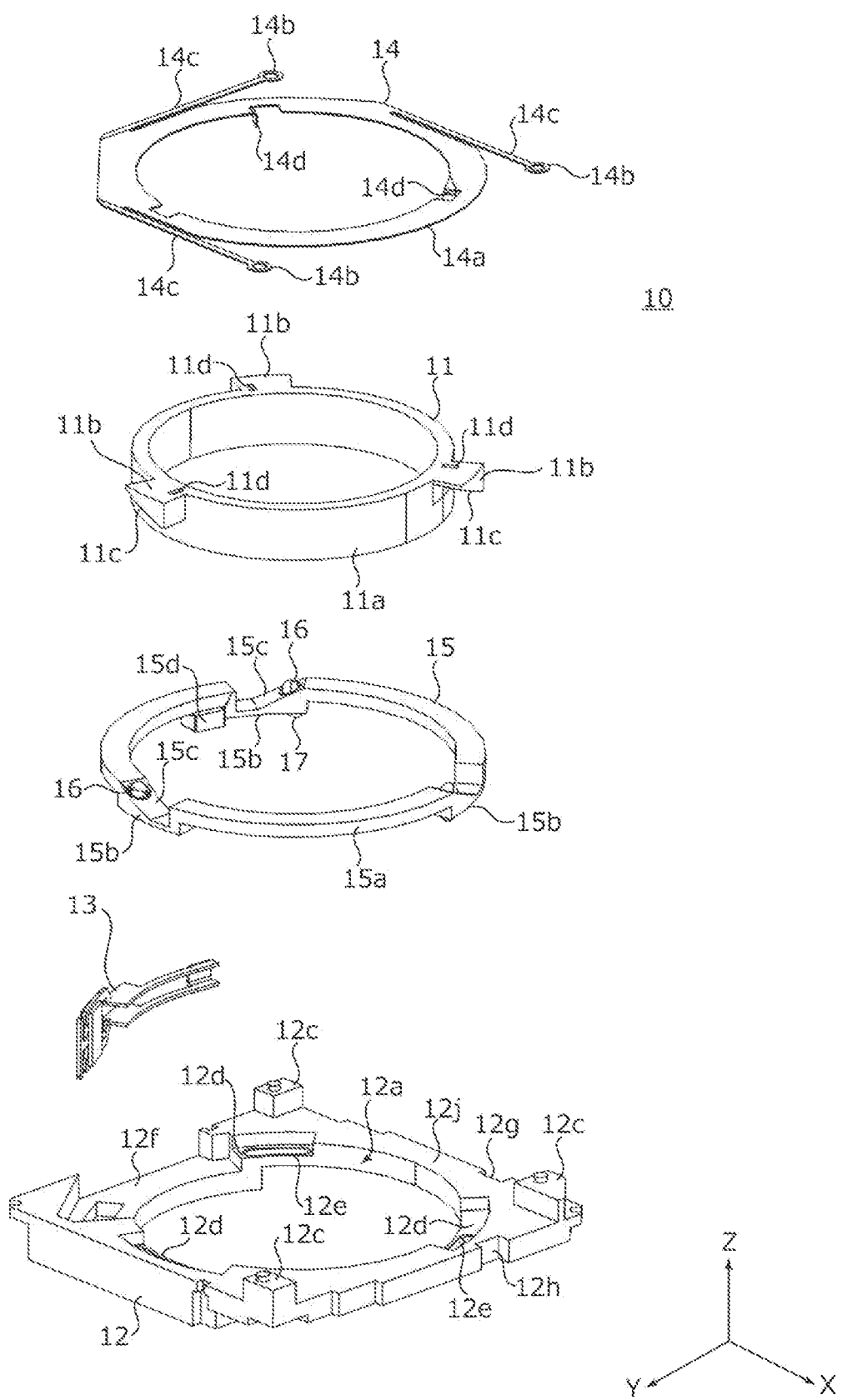
FIG. 7 is an exploded perspective view of an OIS movable part.
Figure 8:
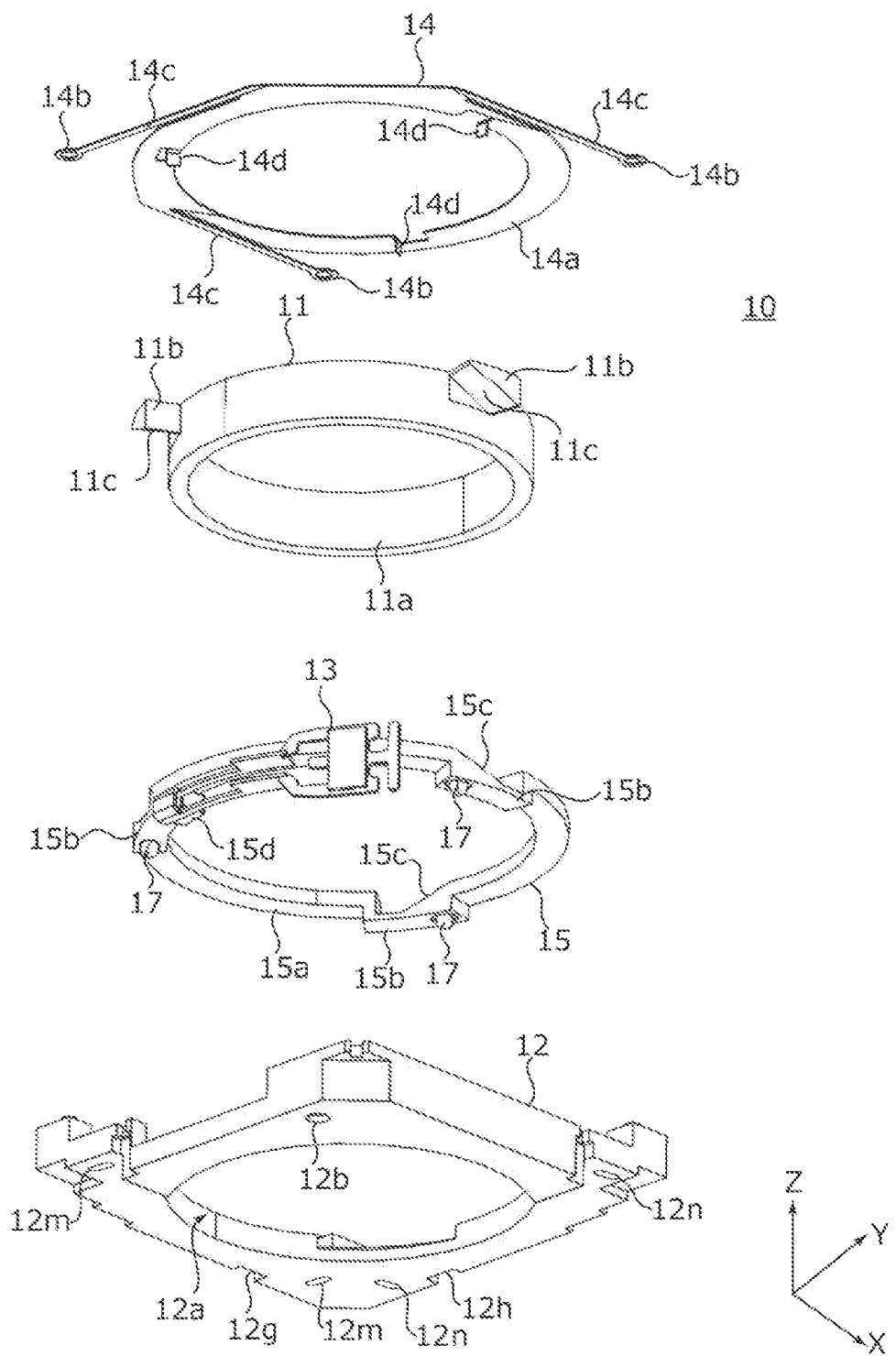
FIG. 8 is an exploded perspective view of the OIS movable part.

FIGS. 7 and 8 are exploded perspective views of OIS movable part 10. FIG. 8 illustrates a state in which FIG. 7 is rotated by 90° around the Z axis and is viewed from below. Note that, FIG. 8 illustrates a state in which AF driving part 13 is attached to rotating spacer 15.

As illustrated in FIGS. 7 and 8, OIS movable part 10 includes AF movable part 11, first stage 12, AF driving part 13, AF support part 14, rotating spacer 15, and the like in the present embodiment.

AF movable part 11 is a portion which moves in the optical axis direction during focusing. AF movable part 11 is disposed so as to be separated from first stage 12 (first fixing part) in a radial direction, and is connected to first stage 12 via AF support part 14.

AF movable part 11 is formed of a lens holder that holds lens part 2 (see FIG. 2) (hereinafter, AF movable part 11 will be referred to as "lens holder 11"). Lens holder 11 is formed of, for example, polyarylate (PAR), a PAR alloy obtained by mixing a plurality of resin materials including PAR, a liquid crystal polymer, or the like. Lens holder 11 includes lens housing part 11a having a cylindrical shape. Lens part 2 (see FIG. 2) is fixed to lens housing part 11a by, for example, adhesion.

Lens holder 11 includes slide part 11b at an outer peripheral edge of an upper part of lens housing part 11a. Slide part 11b protrudes outward in the radial direction. Slide part 11b includes lower surface 11c formed to be inclined in the optical axis direction. It is configured such that slide parts 11b rise to the image formation side in the optical axis direction in conjunction with rotation of rotating spacer 15 and lens holder 11 moves in the optical axis direction.

First stage 12 is a portion that supports lens holder 11 via AF support part 14. Second stages 41X and 41Y are disposed downward from first stage 12 via balls 43. During shake correction, first stage 12 moves in the X direction and the Y direction in conjunction with movement of second stages 41X and 41Y.

First stage 12 is a substantially rectangular tubular member, and is formed of, for example, a liquid crystal polymer. First stage 12 includes opening 12a in a portion corresponding to lens holder 11. Opening 12a has a substantially circular shape. In first stage 12, the portion corresponding to second stages 41X and 41Y is formed to be thinner than the other portion by the thickness of second stages 41X and 41Y.

First stage 12 includes ball housing part 12b on the lower surface. Ball housing part 12b houses ball 42 interposed between first stage 12 and base 21. Ball housing part 12b is formed to be recessed in a circular shape at a position facing ball housing part 21c of base 21 in the Z direction. Further, first stage 12 includes ball housing parts 12m and 12n on the lower surface. Each of ball housing parts 12m and 12n houses ball 43 interposed between first stage 12 and second stages 41X and 41Y. Ball housing part 12m is formed to be recessed in an oval shape extending in the Y direction at a position facing ball housing part 41c of second stage 41X in the Z direction, and ball housing part 12n is formed to be recessed in an oval shape extending in the X direction at a position facing ball housing part 41d of second stage 41Y in the Z direction. Each of ball housing parts 12m and 12n includes side surfaces formed in a tapered shape such that the groove width narrows toward a side of the bottom surface.

First stage 12 includes upper spring fixing parts 12c at three of four corners of the upper surface. Upper spring fixing part 12c fixes AF support part 14. Upper spring fixing part 12c is formed to protrude to the light reception side in the optical axis direction from main surface 12j.

First stage 12 includes spacer placement part 12d and motor fixing part 12f in a peripheral part of opening 12a. Spacer placement part 12d is formed to be recessed to the image formation side in the optical axis direction from main surface 12j, and includes ball housing part 12e that houses ball 17. The rotation of rotating spacer 15 is regulated by a step between spacer placement part 12d and main surface 12j. AF driving part 13 is fixed to motor fixing part 12f.

In the present embodiment, three spacer placement parts 12d are provided at equal intervals along a peripheral direction. Since the attitude of rotating spacer 15 is stabilized thereby, it is possible to control rotational operation accurately. Note that, two spacer placement parts 12d or four or more spacer placement parts 12d may be provided.

In first stage 12, albeit not illustrated, the wiring is disposed by insert-molding, for example. The wiring is exposed from first stage 12 as appropriate, and this exposed part is electrically connected to AF driving part 13 and OIS urging member 44. Power is supplied to AF driving part 13 via OIS urging member 44 and the wiring of first stage 12.

Further, in one side surface of first stage 12 along the X direction and in one side surface thereof along the Y direction, engagement grooves 12g and 12h are provided at positions corresponding to engagement pieces 41e and 41f of second stages 41X and 41Y, respectively. In a state in which lens driving apparatus 1 is assembled, engagement pieces 41e and 41f of second stages 41X and 41Y engage with engagement grooves 12g and 12h of first stage 12, respectively. Thus, OIS movable part 10 (first stage 12) moves in the X direction or the Y direction in conjunction with movement of second stages 41X and 41Y.

AF support part 14 movably supports lens holder 11 in the optical axis direction with respect to first stage 12. In the present embodiment, AF support part 14 is formed of an upper spring that elastically supports lens holder 11 on the light reception side in the optical axis direction (upper side) with respect to first stage 12 (hereinafter, AF support part 14 will be referred to as "upper spring 14"). Upper spring 14 is, for example, a plate spring made of a metal material such as beryllium copper, nickel copper, stainless steel, and the like.

Upper spring 14 includes lens holder fixing part 14a, stage fixing part 14b, and arm part 14c. Lens holder fixing part 14a has a shape corresponding to the upper surface of lens housing part 11a of lens holder 11. Stage fixing part 14b is provided at a position corresponding to upper spring fixing part 12c of first stage 12. Arm part 14c extends from lens holder fixing part 14a, and couples lens holder fixing part 14a to stage fixing part 14b.

For example, upper spring 14 is positioned with respect to and fixed to lens holder 11 by engagement of positioning piece 14d provided in lens holder fixing part 14a with positioning hole 11d provided in slide part 11b of lens holder 11. Further, for example, upper spring 14 is fixed to first stage 12 by adhesion of stage fixing part 14b to upper spring fixing part 12c of first stage 12. When lens holder 11 moves in the optical axis direction, lens holder fixing part 14a is displaced together with lens holder 11, and arm part 14c elastically deforms.

Rotating spacer 15 is a rotating body that rotates around the optical axis by receiving linear motion of AF driving part 13. Rotating spacer 15 has an annular shape, and is disposed along an outer peripheral surface of lens holder 11. Further, rotating spacer 15 includes motor connecting part 15d to which AF driving part 13 is connected.

Rotating spacer 15 includes annular part 15a and stage fixing part 15b. Stage fixing part 15b is provided at a position corresponding to spacer placement part 12d of first stage 12, and is formed, for example, to protrude to the image formation side in the optical axis direction from annular part 15a. Stage fixing part 15b includes upper surface 15c formed to be inclined in the optical axis direction, where slide part 11b of lens holder 11 is placed (hereinafter, upper surface 15c will be referred to as "holder guide part 15c").

Holder guide part 15c of rotating spacer 15 and slide part 11b of lens holder 11 form end surface cam 18 (see FIG. 10A or the like) in which slide part 11b slides along holder guide part 15c in accordance with the rotation of rotating spacer 15. End surface cam 18 is a mechanical element that converts rotational motion into linear motion in the optical axis direction.

In the present embodiment, three end surface cams 18 are provided at equal intervals along the peripheral direction. Thus, rotational motion of rotating spacer 15 is converted into linear motion by end surface cams 18 and is uniformly transmitted to lens holder 11 so that it is possible to control operation of movement of lens holder 11 accurately. Note that, two end surface cams 18 or four or more end surface cams 18 may also be provided at equal intervals along the peripheral direction.

In the present embodiment, it is configured such that ball 16 is disposed between holder guide part 15c and slide part 11b, holder guide part 15c and slide part 11b indirectly abuts on each other, and rotating spacer 15 and lens holder 11 slide smoothly. Note that, it may also be configured such that no ball 16 is disposed between rotating spacer 15 and lens holder 11, and both directly abut on each other and slide.

Further, it is configured such that balls 17 are disposed between rotating spacer 15 and first stage 12, and rotating spacer 15 smoothly rotates on first stage 12.

AF driving part 13 is an actuator that moves lens holder 11 in the Z direction. In the same manner as in OIS driving part 30, AF driving part 13 is formed of an ultrasonic motor. AF driving part 13 is fixed to motor fixing part 12f of first stage 12 so as to be along a peripheral surface of rotating spacer 15.

Figure 9:
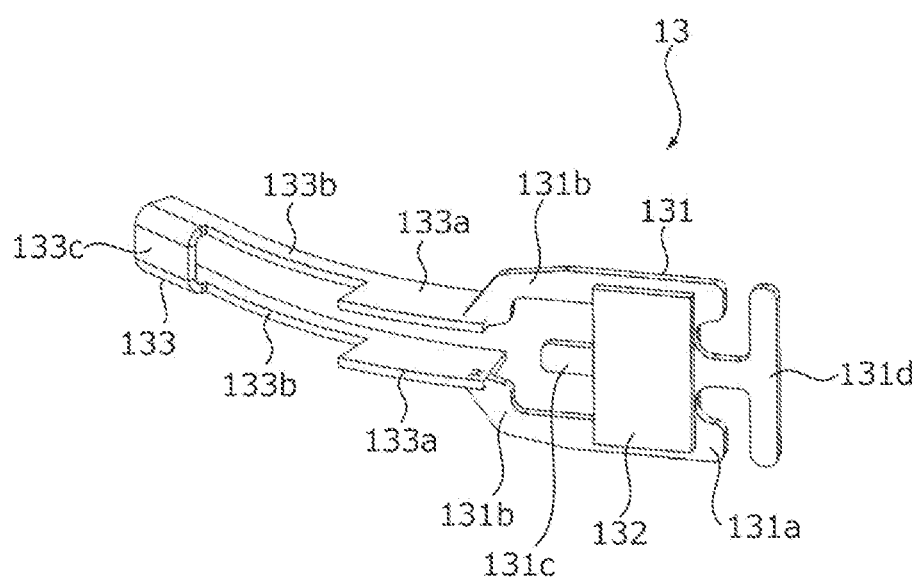
FIG. 9 is a perspective view of an AF driving part.

FIG. 9 illustrates the configuration of AF driving part 13.

As illustrated in FIG. 9, AF driving part 13 includes AF resonance part 131, AF piezoelectric element 132, an AF electrode (not illustrated), and AF power transmission part 133. AF resonance part 131, AF piezoelectric element 132, and the AF electrode (not illustrated) form an ultrasonic motor. The driving force of the ultrasonic motor is transmitted to rotating spacer 15 via AF power transmission part 133.

AF piezoelectric element 132 is, for example, a plate-like element formed of a ceramic material, and generates vibration by application of a high-frequency voltage.

The AF electrode (not illustrated) holds AF resonance part 131 and AF piezoelectric elements 132 from both sides, and applies a voltage to AF piezoelectric elements 132. The AF electrode is electrically connected to the wiring (not illustrated) of first stage 12, for example.

AF resonance part 131 is formed of a conductive material, and resonates with vibration of AF piezoelectric element 132 to convert vibration motion into linear motion. In the present embodiment, AF resonance part 131 includes trunk part 131a, two arm parts 131b, protrusion part 131c, and energization part 131d. Trunk part 131a has a substantially rectangular shape and is held between AF piezoelectric elements 132. Two arm parts 131b extend from upper and lower parts of trunk part 131a. Protrusion part 131c extends from a central part of trunk part 131a. Energization part 131d extends on a side opposite to protrusion part 131c from the central part of trunk part 131a, and is electrically connected to a power supply path (the wiring of first stage 12). Each of two arm parts 131b has a symmetric shape, includes a free end part that abuts on AF power transmission part 133, and symmetrically deforms when resonating with the vibration of AF piezoelectric element 132.

Trunk part 131a of AF resonance part 131 and AF piezoelectric elements 132 are electrically connected to each other by bonding AF piezoelectric elements 132 to trunk part 131a in the thickness direction and causing trunk part 131a and AF piezoelectric elements 132 to be held from both sides by the AF electrode (not illustrated). For example, energization part 131d of AF resonance part 131 and the AF electrode (not illustrated) are connected to the wiring (not illustrated) of first stage 12 so that a voltage is applied to AF piezoelectric elements 132 and vibration is generated.

In the same manner as in OIS resonance part 31, AF resonance part 131 has at least two resonance frequencies, and deforms in different behaviors for each resonance frequency. In other words, the entire shape of AF resonance part 131 is set so as to deform in different behaviors with respect to the two resonance frequencies. The different behaviors refer to behaviors of advancing and retracting AF power transmission part 133 along the peripheral direction.

AF power transmission part 133 is a chucking guide extending along the peripheral direction, and includes one end, which is connected to AF resonance part 131, and another end, which is connected to rotating spacer 15. AF power transmission part 133 includes AF motor abutment part 133a, spacer fixing part 133c, and coupling part 133b. AF motor abutment part 133a is formed, for example, in a flat plate shape, and abuts on the free end part of arm part 131b of AF resonance part 131. Spacer fixing part 133c is disposed in an end part of AF power transmission part 133, and is fixed to motor connecting part 15d of rotating spacer 15. Coupling part 133b is a portion that couples AF motor abutment part 133a to spacer fixing part 133c, and is formed to branch into two from spacer fixing part 133c such that the branched portions are in parallel with each other and are curved so as to be along the peripheral direction.

AF power transmission part 133 moves by receiving linear motion of AF resonance part 131. However, since one end of AF power transmission part 133 is connected and constrained to rotating spacer 15, arm part 131b of AF resonance part 131 and AF motor abutment part 133a of AF power transmission part 133 slide and AF power transmission part 133 rotates. That is, AF driving part 13, when including AF power transmission part 133, can be said to convert vibration motion into rotational motion.

The width between AF motor abutment parts 133a is set to be wider than the width between the free end parts of arm parts 131b of AF resonance part 131. Thus, when AF power transmission part 133 is attached to AF resonance part 131, AF power transmission part 133 functions as a plate spring, and an urging force acts in a direction in which arm parts 131b of AF resonance part 131 are pushed and spread. This urging force causes AF power transmission part 133 to be held between the free end parts of arm parts 131b of AF resonance part 131 so that a driving force from AF resonance part 131 is efficiently transmitted to AF power transmission part 133.

Since AF resonance part 131 only abuts on AF power transmission part 133 in an urged state, the amount of rotation of rotating spacer 15, that is, the movement distance (the stroke in the optical axis direction) of lens holder 11 can be lengthened without enlarging the outer shape of lens driving apparatus 1, only by increasing the abutment portion along the peripheral direction.

In lens driving apparatus 1, when a voltage is applied to AF driving part 13, AF piezoelectric element 132 vibrates, and AF resonance part 131 deforms in a behavior corresponding to the frequency. The driving force of AF driving part 13 causes rotating spacer 15 to rotate, lens holder 11 to move in the optical axis direction, and focusing to be performed.

Figure 10A:
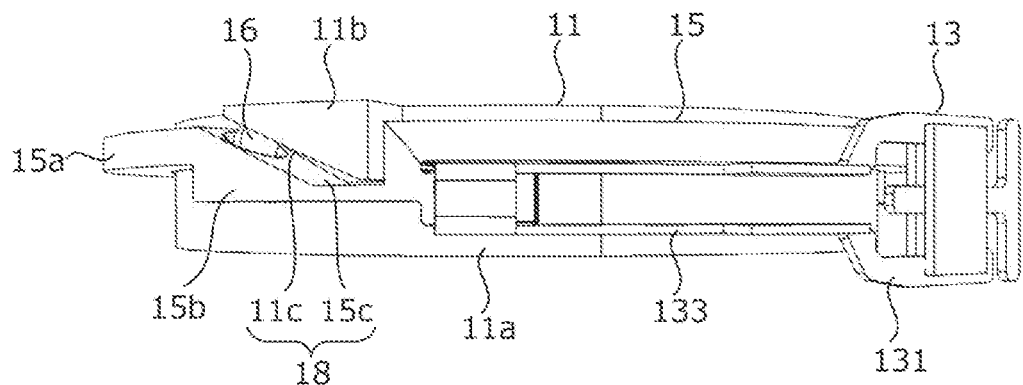
FIGS. 10A and 10B illustrate a behavior of a lens holder in accordance with rotation of a rotating spacer.
Figure 10B:
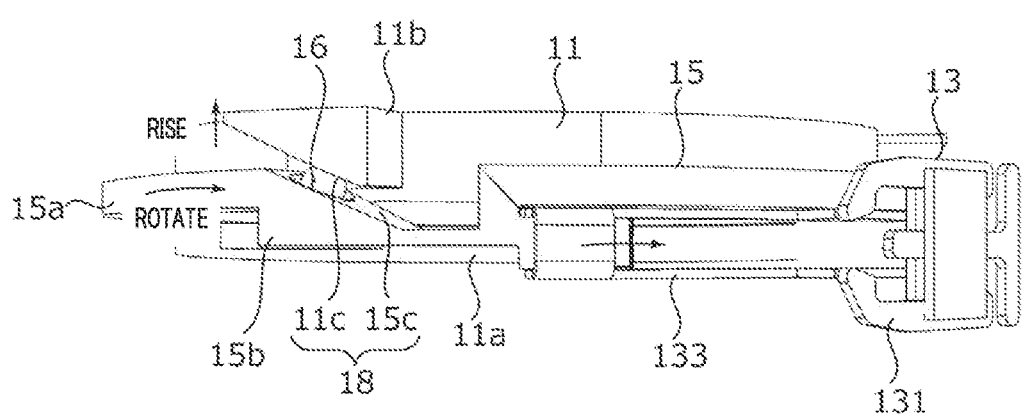

FIGS. 10A and 10B illustrate specific examples of a behavior of lens holder 11 in accordance with the rotation of rotating spacer 15. FIG. 10A illustrates an initial state in which AF driving part 13 is not driven. FIG. 10B illustrates a state in which AF driving part 13 is driven.

As illustrated in FIGS. 10A and 10B, when AF driving part 13 is driven and AF power transmission part 133 is drawn to a side of AF resonance part 131, rotating spacer 15 connected to AF power transmission part 133 rotates, and in accordance therewith end surface cam 18 operates, slide part 11b of lens holder 11 rises along holder guide part 15c of rotating spacer 15, and lens holder 11 moves to the light reception side in the optical axis direction.

In lens driving apparatus 1, when a voltage is applied to OIS driving part 30, OIS piezoelectric element 32 vibrates, and OIS resonance part 31 deforms in a behavior corresponding to the frequency. The driving force of OIS driving part 30 causes OIS power transmission part 33 to slide in the X direction or the Y direction, and in accordance therewith OIS movable part 10 moves in the X direction or the Y direction and shake correction is performed.

Specifically, in a case where first OIS driving part 30X is driven and OIS power transmission part 33 moves in the X direction, power is transmitted from base 21, in which first OIS driving part 30X is disposed, to second stage 41X. Since balls 42 (balls 42 housed in ball housing parts 21d) held between second stage 41X and base 21 are disposed so as to be rollable in the X direction, second stage 41X moves in the X direction with respect to base 21. Since balls 43 (balls 43 disposed in ball housing parts 41c) held between first stage 12 and second stage 41X cannot roll in the X direction so that the position of first stage 12 in the X direction with respect to second stage 41X is maintained, and first stage 12 moves in the X direction in conjunction with second stage 41X.

At this time, since balls 43 (balls 43 disposed in ball housing parts 41d) held between second stage 41Y and first stage 12 are disposed so as to be rollable in the X direction, first stage 12 smoothly slides on second stage 41Y. Further, movement of second stage 41Y in the X direction with respect to base 21 is regulated by balls 42 (balls 42 disposed in ball housing parts 21e) held between second stage 41Y and base 21.

Accordingly, second stage 41Y is not displaced with respect to base 21, and only second stage 41X and first stage 12 move in the X direction.

In the same manner, in a case where second OIS driving part 30Y is driven and OIS power transmission part 33 moves in the Y direction, power is transmitted from base 21, in which second OIS driving part 30Y is disposed, to second stage 41Y. Since balls 42 (balls 42 disposed in ball housing parts 21e) held between second stage 41Y and base 21 are disposed so as to be rollable in the Y direction, second stage 41Y moves in the Y direction with respect to base 21. Since balls 43 (balls 43 disposed in ball housing parts 41d) held between first stage 12 and second stage 41Y cannot roll in the Y direction, the position of first stage 12 in the Y direction with respect to second stage 41Y is maintained, and first stage 12 moves in the Y direction in conjunction with second stage 41Y.

At this time, since balls 43 (balls 43 disposed in ball housing parts 41c) held between first stage 12 and second stage 41X are disposed so as to be rollable in the Y direction, first stage 12 smoothly slides on second stage 41X. Further, movement of second stage 41X in the Y direction with respect to base 21 is regulated by balls 42 (balls 42 housed in ball housing parts 21d) held between second stage 41X and base 21.

Accordingly, second stage 41X is not displaced with respect to base 21, and only second stage 41Y and first stage 12 move in the Y direction.

As described above, second stages 41X and 41Y are configured not to interfere with each other and to be movable independently of each other. That is, first OIS driving part 30X connected to second stage 41X does not receive a force in the Y direction by movement of second stage 41Y, and second OIS driving part 30Y connected to second stage 41Y does not receive a force in the X direction by movement of second stage 41X. Accordingly, it is possible to accurately perform shake correction within the XY plane.

In this way, OIS movable part 10 sways within the XY plane and shake correction is performed. Specifically, the energizing voltage to OIS driving part 30 is controlled based on an angle shake-indicating detection signal from a shake detection part (for example, a gyro sensor; not illustrated) so as to offset an angle shake of camera module A. At this time, feedback on a detection result of the XY-position detection part formed of magnets 52X and 52Y and Hall elements 51X and 51Y makes it possible to accurately control translational movement of OIS movable part 10.

Thus, lens driving apparatus 1 according to the embodiment includes: first stage 12 (first fixing part); lens holder 11 (first movable part) that holds lens part 2 and is disposed so as to be separated from first stage 12; AF support part 14 (first support part) that supports lens holder 11 with respect to first stage 12; and AF driving part 13 (Z-direction driving part) that is formed of an ultrasonic motor and moves lens holder 11 in the optical axis direction with respect to first stage 12. The ultrasonic motor converts vibration motion into linear motion. Lens driving apparatus 1 includes rotating spacer 15 (rotating body) and end surface cam 18 (mechanical element). Rotating spacer 15 rotates around the optical axis by receiving linear motion of AF driving part 13. End surface cam 18 converts rotational motion of rotating spacer 15 into linear motion in the optical axis direction. Lens holder 11 moves in the optical axis direction by rotation of rotating spacer 15.

Since AF driving part 13 is formed of an ultrasonic motor, lens driving apparatus 1 makes it possible to reduce the impact of external magnetism and allows miniaturization and a reduction in height. Accordingly, since there is no magnetic impact even when camera modules A including lens driving apparatus 1 are disposed close to each other as in smartphone M, lens driving apparatus 1 is extremely suitable for use as a dual camera.

While the invention made by the present inventors has been specifically described thus far based on the preferred embodiment, the present invention is not limited to the preferred embodiment described above and can be modified without departing from the gist thereof.

For example, although smartphone M that is a camera-equipped mobile terminal has been described as an example of the camera-mounted apparatus including camera module A in the preferred embodiment, the present invention is applicable to a camera-mounted apparatus that includes a camera module; and an image-processing part that processes image information obtained by the camera module. The camera-mounted apparatus encompasses information apparatuses and transport apparatuses. The information apparatuses include, for example, camera-equipped mobile phones, notebook personal computers, tablet terminals, mobile game machines, webcams, and camera-equipped in-vehicle apparatuses (such as rear-view monitor apparatuses and dashboard camera apparatuses). Further, the transport apparatuses include, for example, automobiles.

Figure 11A:
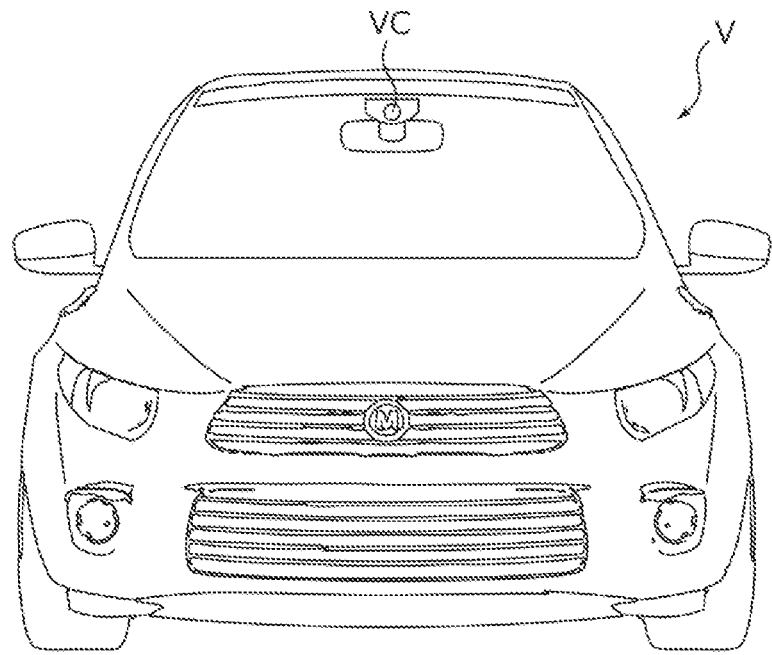
FIGS. 11A and 11B illustrate an automobile as a camera-mounted apparatus in which an in-vehicle camera module is mounted.
Figure 11B:
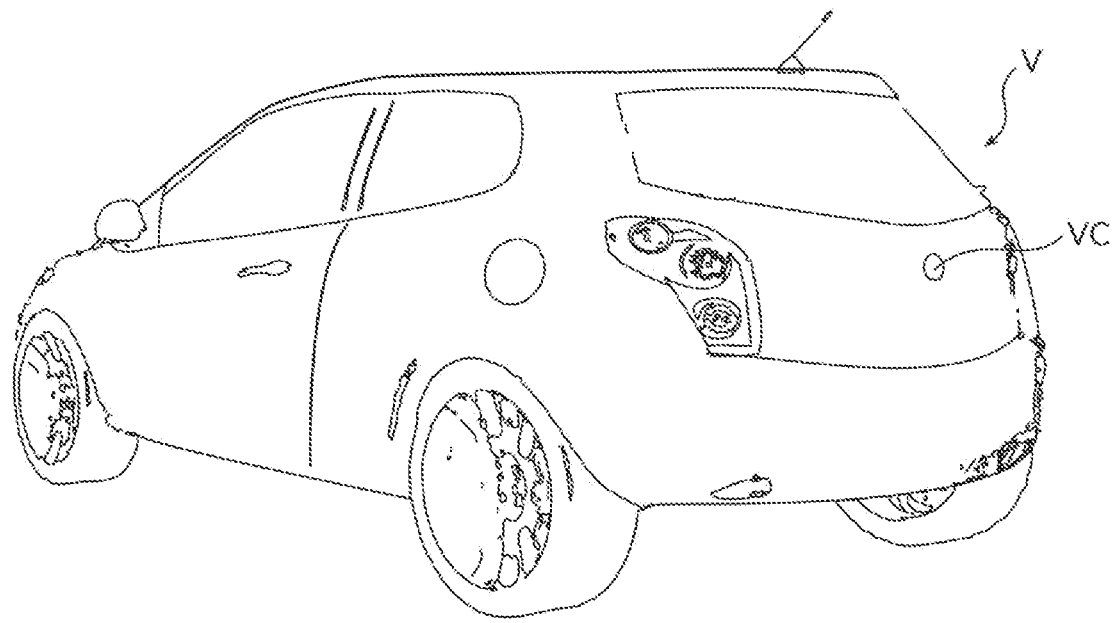

FIGS. 11A and 11B illustrate automobile V as a camera-mounted apparatus in which in-vehicle camera module vehicle camera (VC) is mounted. FIG. 11A is a front view of automobile V, and FIG. 11B is a rear perspective view of automobile V. In automobile V, camera module A described in the preferred embodiment is mounted as in-vehicle camera module VC. As illustrated in FIGS. 11A and 11B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, and the like.

Further, although end surface cam 18 formed of slide part 11b of lens holder 11 and holder guide part 15c of rotating spacer 15 is utilized in the preferred embodiment, any other cam structure or the like may be applied to the mechanical element interposed between lens holder 11 and rotating spacer 15.

Further, although lens holder 11 is moved in the optical axis direction by rotating spacer 15 by AF driving part 13 and by causing end surface cam 18 to convert rotational motion into linear motion in the preferred embodiment, it may also be configured such that lens holder 11 is moved, while being rotated, in the optical axis direction, that is, lens holder 11 functions as a rotating body to perform spiral motion. In this case, the mechanical element is provided between lens holder 11 and first stage 12.

In addition, the present invention is applicable not only to autofocus, but to a case where a first movable part (lens holder 11) is moved in the optical axis direction, such as zoom.

The embodiment disclosed herein is merely an exemplification in every respect and should not be considered as limitative. The scope of the present invention is specified not by the description provided above, but by the appended claims, and is intended to include all modifications in so far as they are within the scope of the appended claims or the equivalents thereof.

REFERENCE SIGNS LIST

1 Lens driving apparatus
10 OIS movable part (second movable part)
11 AF movable part, lens holder (first movable part)
11b Slide part
12 First stage (first fixing part)
13 AF driving part (Z-direction driving part)
14 AF support part, upper spring (first support part)
15 Rotating spacer
15c Holder guide part
16, 17 Ball
18 End surface cam (mechanical element)
20 OIS fixing part (second fixing part)
30 OIS driving part (XY-direction driving part)
40 OIS support part (second support part)

What is claimed is:

1. A lens driving apparatus, comprising:
a first fixing part;
a first movable part that includes a lens holder and is disposed so as to be separated from the first fixing part, the lens holder holding a lens part;
a first support part configured to support the first movable part with respect to the first fixing part; and
a Z-direction driving part that comprises an ultrasonic motor and moves the first movable part in a direction of an optical axis with respect to the first fixing part, the ultrasonic motor being configured to convert vibration motion into linear motion, wherein:
the lens driving apparatus further comprises a rotating body and a mechanical element, the rotating body being configured to rotate around the optical axis by receiving linear motion of the Z-direction driving part, the mechanical element being configured to convert rotational motion of the rotating body into linear motion in the direction of the optical axis,
the first movable part is configured to move in the direction of the optical axis by rotation of the rotating body, and
the lens driving apparatus further comprises:
a second movable part including the first fixing part, the first movable part, the first support part, and the Z-direction driving part;
a second fixing part disposed so as to be separated from the second movable part;
a second support part configured to support the second movable part with respect to the second fixing part; and
an XY-direction driving part configured to move the second movable part within an optical axis-orthogonal plane orthogonal to the direction of the optical axis with respect to the second fixing part.

2. The lens driving apparatus according to claim 1, further comprising a rotating spacer that has a ring shape, is disposed along an outer peripheral surface of the lens holder, is connected to the Z-direction driving part, and functions as the rotating body, wherein
the lens holder and the rotating spacer are connected to each other via the mechanical element.

3. The lens driving apparatus according to claim 2, wherein:
the rotating spacer includes a holder guide part on a surface on a light reception side in the direction of the optical axis, the holder guide part being inclined along a peripheral direction,
the lens holder includes a slide part that abuts on the holder guide part, and
the holder guide part and the slide part are configured to slide in accordance with rotation of the rotating spacer, and form an end surface cam that functions as the mechanical element.

4. The lens driving apparatus according to claim 3, wherein a plurality of the end surface cams is disposed at equal intervals in the peripheral direction.

5. The lens driving apparatus according to claim 3, wherein a ball is interposed between the holder guide part and the slide part.

6. The lens driving apparatus according to claim 1, wherein the lens holder is connected to the first fixing part via the mechanical element while being connected to the Z-direction driving part to function as the rotating body and perform spiral motion by receiving the rotational motion.

7. The lens driving apparatus according to claim 1, wherein the XY-direction driving part comprises an ultrasonic motor configured to convert vibration motion into linear motion.

8. A camera module, comprising:
the lens driving apparatus according to claim 1;
the lens part that is attached to the first movable part; and
an image-capturing part configured to capture a subject image formed by the lens part.

9. A camera-mounted apparatus, which is an information apparatus or a transport apparatus, the camera-mounted apparatus comprising:
the camera module according to claim 8; and an image-processing part configured to process image information obtained by the camera module.

\* \* \* \* \*